(12) United States Patent
Yi et al.

(10) Patent No.: US 10,474,413 B2
(45) Date of Patent: Nov. 12, 2019

(54) DISPLAY STRUCTURE, DISPLAY METHOD, DISPLAY DEVICE AND OPERATING SYSTEM FOR PROVIDING MULTIPLE USER DISPLAY INTERFACES

(71) Applicant: BOE TECHNOLOGY GROUP CO., LTD., Beijing (CN)

(72) Inventors: Zhusong Yi, Beijing (CN); Weiguo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/943,831

(22) Filed: Apr. 3, 2018

(65) Prior Publication Data

US 2019/0121591 A1 Apr. 25, 2019

(30) Foreign Application Priority Data

Oct. 20, 2017 (CN) .......................... 2017 1 0984352

(51) Int. Cl.
| | |
|---|---|
| G06F 3/048 | (2013.01) |
| H04N 21/431 | (2011.01) |
| G09G 5/391 | (2006.01) |
| G06F 3/14 | (2006.01) |
| H04N 21/443 | (2011.01) |
| G09G 5/14 | (2006.01) |
| G09G 5/36 | (2006.01) |
| G09G 5/377 | (2006.01) |
| G09G 5/397 | (2006.01) |

(52) U.S. Cl.
CPC ............ G06F 3/1423 (2013.01); G06F 3/048 (2013.01); G09G 5/14 (2013.01); G09G 5/363 (2013.01); G09G 5/377 (2013.01); G09G 5/391 (2013.01); G09G 5/397 (2013.01); H04N 21/431 (2013.01); H04N 21/4438 (2013.01); G09G 2340/0407 (2013.01)

(58) Field of Classification Search
None
See application file for complete search history.

(56) References Cited

U.S. PATENT DOCUMENTS

| | | | | |
|---|---|---|---|---|
| 6,614,445 | B1 * | 9/2003 | Dorbie ................... | G06T 15/04 |
| | | | | 345/582 |
| 2008/0057918 | A1 * | 3/2008 | Abrant ................... | H04H 20/26 |
| | | | | 455/414.1 |
| 2008/0163368 | A1 * | 7/2008 | Harris ..................... | G06F 21/79 |
| | | | | 726/21 |
| 2012/0268495 | A1 * | 10/2012 | Lee ......................... | G06F 3/147 |
| | | | | 345/660 |

* cited by examiner

*Primary Examiner* — Joni Richer
(74) *Attorney, Agent, or Firm* — Nath, Goldberg & Meyer; Joshua B. Goldberg; Daniel Bissing (57) ABSTRACT

There are provided a display structure, a display method, a display device and an operating system. The display structure includes: a first display buffer configured to store a first user display interface; a second display buffer configured to store a second user display interface; and a display cache, the second user display interface is a user display interface that is obtained by processing the first user display interface and has a resolution conforming to a resolution of the display cache.

17 Claims, 4 Drawing Sheets

DISPLAY STRUCTURE, DISPLAY METHOD, DISPLAY DEVICE AND OPERATING SYSTEM FOR PROVIDING MULTIPLE USER DISPLAY INTERFACES

CROSS REFERENCE FOR RELATED APPLICATION

This application claims priority from Chinese Patent Application No. 201710984352.9 filed on Oct. 20, 2017, the disclosure of which is incorporated herein by reference.

FIELD

The present disclosure relates to the field of display technology, and in particular to a display structure, a display method, a display device and an operating system.

BACKGROUND

Android system provides a standard UI display mechanism (that is, user interface display mechanism), specifically, an application layer organizes a display area through a surface (application window), then integrates the display area through a surfaceflinger (Android system service, responsible for managing a frame buffer, which is a display screen, of the Android system) and finally displays it on a screen by a hardware display apparatus. An UI display mechanism of the Android system satisfying situations having high real-time requirements is desired.

SUMMARY

The present disclosure provides a display structure comprising: a first display buffer configured to store a first user display interface; a second display buffer configured to store a second user display interface; and a display cache, wherein the second user display interface is a user display interface that is obtained by processing the first user display interface and meets a resolution of the display cache.

In some embodiments, the display structure further comprising: a third display buffer configured to store a current user display interface in the display cache.

In some embodiments, a resolution of the first display buffer is equal to a resolution of the first user display interface; a resolution of the second display buffer is equal to the resolution of the display cache; and a resolution of the third display buffer is equal to the resolution of the display cache.

The present disclosure provides a display method for displaying by using the display structure described above, the display method comprising steps of: adding the first user display interface into the first display buffer of the display structure; copying the first user display interface in the first display buffer into the second display buffer to form a second user display interface in the second display buffer; copying the second user display interface in the second display buffer into the display cache; displaying the second user display interface in the display cache.

In some embodiments, the method further comprises a step of: before the step of copying the first user display interface in the first display buffer into the second display buffer, scaling the resolution of the first user display interface to obtain a second user display interface having a resolution that conforms to the resolution of the display cache.

In some embodiments, the display structure further comprises a third display buffer, and the display method further comprises a step of: copying the current user display interface in the display cache into the third display buffer of the display structure.

In some embodiments, the first user display interface is copied into the second display buffer in a form of frame data; and the second user display interface is copied into the display cache in the form of frame data.

In some embodiments, the step of scaling the resolution of the first user display interface to obtain the second user display interface having a resolution that conforms to the resolution of the display cache comprises: in a case where the resolution of the first display buffer is less than the resolution of the second display buffer, scaling up the first user display interface to obtain the second user display interface; in a case where the resolution of the first display buffer is greater than the resolution of the second display buffer, scaling down the first user display interface to obtain the second user display interface. In some embodiments, the resolution of the first display buffer is equal to the resolution of the first user display interface; the resolution of the second display buffer is equal to the resolution of the display cache; and the resolution of the third display buffer is equal to the resolution of the display cache.

In some embodiments, the display method further comprises a step of: restoring the current user display interface in the third display buffer to the display cache and displaying the current user display interface.

The present disclosure further provides a display device comprising: the display structure described above; an adding component configured to add a first user display interface into a first display buffer of the display structure; a first copy component configured to copy the first user display interface in the first display buffer into the second display buffer to form a second user display interface in the second display buffer; a second copy component configured to copy the second user display interface in the second display buffer to a display cache; and a display component configured to display the second user display interface in the display cache.

In some embodiments, the display device further comprises a third copy component configured to copy a current user display interface in the display cache into a third display buffer of the display structure.

In some embodiments, the display device further comprises a scaling component configured to scale the resolution of the first user display interface to obtain the second user display interface having a resolution that conforms to the resolution of the display cache.

In some embodiments, the scaling component comprises: an scaling-up part configured to scale up the first user display interface to obtain the second user display interface in a case where the resolution of the first display buffer is less than the resolution of the second display buffer; a scaling-down part configured to scale down the first user display interface to obtain the second user display interface in a case where the resolution of the first display buffer is greater than the resolution of the second display buffer.

In some embodiments, the resolution of the first display buffer is equal to the resolution of the first user display interface; the resolution of the second display buffer is equal to the resolution of the display cache; and the resolution of the third display buffer is equal to the resolution of the display cache.

In some embodiments, the display device further comprises a restoring component configured to restore the current user display interface in the third display buffer into the display cache.

The present disclosure further provides an operating system, which comprises the display device described above.

REFERENCE NUMERALS 1. first display buffer; 2. second display buffer; 3. display cache; 4. third display buffer; 5. adding component; 6. first copy component; 7. second copy component; 8. display component; 9. scaling component; 91. scaling-up part; 92. scaling-down part; 10. third copy component; 11. restore component.

DETAILED DESCRIPTION OF THE EMBODIMENTS

To enable those skilled in the art to better understand technical solutions of the present disclosure, a display structure, a display method, a display device and an operating system provided by the present disclosure will be further described in detail with reference to accompanying drawings and specific implementations.

The standard UI display mechanism of the Android system uses controls as the topmost display UI, and includes following processes: a surface of Java level, a local interface calling a surface of C level, a surfaceflinger intergration, an open graphics library of an embedded system (Opengl ES), a FrameBufferNativeWindow, a framebuffer, a display apparatus, which are performed successively from top to bottom, thus each display operation must undergoes these processes successively from top to bottom, resulting in a long time for each drawing procedure and an increased display time overhead. This completely cannot meet display situations having high real-time requirements. Meanwhile, this also causes an inefficient display of the standard UI display mechanism of the Android system. Therefore, how to make the UI display mechanism of the Android system meet the display situations having real-time requirements becomes a problem to be solved.

Figure 1:
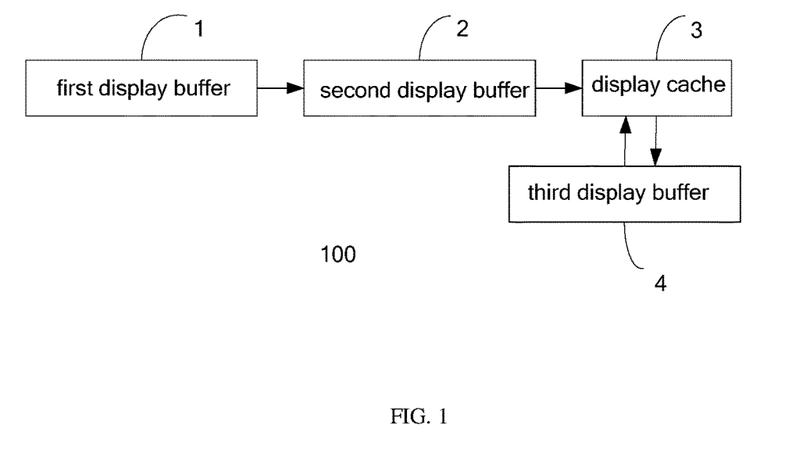
FIG. 1 is a schematic diagram of a physical architecture of a display structure in an embodiment of the present disclosure.

An embodiment of the present disclosure provides a display structure 100, as shown in FIG. 1, the display structure 100 includes a first display buffer 1, a second display buffer 2 and a display cache 3. The first display buffer 1 is configured to store a first user display interface. The second display buffer 2 is configured to store a second user display interface, wherein, the second user display interface is a user display interface that is obtained by processing the first user display interface and conforms to the resolution of the display cache 3.

The first user display interface is a user interface element to be displayed (such as a button, a key, and an icon on an application interface) or a user interface to be displayed (that is, an application interface, such as a Word document editing interface, an AutoCAD drawing software interface etc.). User interface elements or user interfaces to be displayed can be added to the first display buffer 1 one by one after being drawn. The second user display interface is a user display interface whose resolution is the same as the resolution of the display cache 3 and is obtained by processing (e.g., copying, scaling-up or scaling-down resolution of) the first user display interface. Since the first user display interface is ultimately to be displayed on the display screen, it needs to be put in the display cache 3 before being displayed on the display screen. Before being put in the display cache 3, the first user display interface needs to be formed into an entire frame image and to be performed resolution processing thereon, so that it can be put into the display cache 3. Therefore the first user display interface needs to be copied to the second display buffer 2 in the form of a frame image, and the procedure in which the first user interface is copied into the second buffer 2 is a procedure in which the first user display interface is processed. During the procedure of copying the first user display interface into the second display buffer 2, it is necessary to determine whether the resolution of the first user display conforms to the resolution of the display cache 3, and if not, the resolution of the first user display interface needs to be scaled up or scaled down during copying the first user display interface into the second display buffer 2, so that the resolution of the first user display interface conforms to the resolution of the display cache 3. The display cache 3 is a portion of a memory (i.e., all memory space in a graphics card), and is used for storing a frame of image to be displayed, the frame of image to be displayed is the second user display interface stored in the second display buffer 2.

Compared with a standard UI display framework (i.e., standard user interface display framework) of an existing Android system, the display structure with the above physical architecture can greatly reduce the number of processes during each display operation, reduce the time for each drawing and thus reduce the display time overhead. Nearly half of the time can be saved for each drawing operation, and then requirements of some display situations having high real time requirements that cannot be met by the standard UI display framework can be satisfied, and the display efficiency of the user interface can be increased.

In addition, the display structure with such physical architecture can also realize the display of a non-Android application user interface (such as a linux application user interface) on the Android system, that is, realizing the display docking with the non-Android application and achieving the technical effect in which the standard Android display mechanism is realized and other efficient display channels are provided. The reason for the display structure with such physical architecture being capable of realizing the display of the non-Android application user interface on the Android system is that the non-Android application mentioned here refers to a non-android APP application and is an underlying application of the Android system, since the Android system is dependent on a linux kernel, and the display mechanism in the present application is a low-level display mechanism thus it depends on the linux kernel and is implemented with C-level codes, therefore, the display mechanism can support linux applications, that is to say, non-android applications (linux applications, android underlying applications) can run on the Android system (the display mechanism runs on the underlayer of the Android system).

In this embodiment, the display structure further includes a third display buffer 4, and the third display buffer 4 is configured to store the current user display interface in the display cache 3. The current user display interface refers to the user display interface previously stored in the display cache 3 before the second user display interface is placed into the display cache 3. For example, in this embodiment, the user display interface previously stored in the cache 3 may be the standard UI display framework of the Android system (i.e., the standard user interface display framework). Since the current user display interface is generally stored in the display cache 3, for example, the display content of the standard UI display framework is stored in the display cache 3 of the Android system, the setting of the third display buffer 4 can allow the current user display interface previously stored in the display cache 3 to be copied into the third display buffer 4, so as to prevent the current user display interface previously stored in the display cache 3 from cannot being restored due to being overwritten by storing the display content of the display structure into the display cache 3, thus it is ensured that the current user display interface previously stored in the display cache 3 can be restored and displayed when the display cache 3 does not store the display content of the display structure any longer, for example, in the Android system, when the display cache 3 does not store the display content of the display structure any longer, the display content of the standard UI display framework previously stored in the display cache 3 can be restored from the third display buffer 4 to the display cache 3 and displayed.

In this embodiment, the resolution of the first display buffer 1 is equal to the resolution of the first user display interface, that is, the size of the first display buffer 1 is allocated according to the size of the first user display interface. If the first user display interface is to be designed to have a resolution of 1280*800, the size of the first display buffer 1 is allocated to be 1280*800. The resolution of the second display buffer 2 is equal to the resolution of the display cache 3. Since the second user display interface in the second display buffer 2 is directly stored into the display cache 3, the resolutions of the second display buffer 2 and the display cache 3 are the same with each other, for example, if the resolution of the display cache 3 is 1920*1080, then the size of the second display buffer 2 also needs to be allocated to be 1920*1080. The resolution of the third display buffer 4 is equal to the resolution of the display cache 3. The third display buffer 4 backs up the current user display interface previously stored in the display cache 3, so the resolution of the third display buffer 4 needs to be the same as that of the display cache 3.

Beneficial effects of this embodiment: compared to the standard UI display framework of the existing Android system (i.e., the standard user interface display framework), the display structure provided in this embodiment is equipped with a first display buffer and a second display buffer in the physical architecture, and can greatly reduce the number of processes during each display operation, reducing the time for each drawing and thus reducing the display time overhead. Requirements of some display situations having high real-time requirements that cannot be met by the standard UI display framework can be satisfied, and the display efficiency of the user interface is increased.

Figure 2:
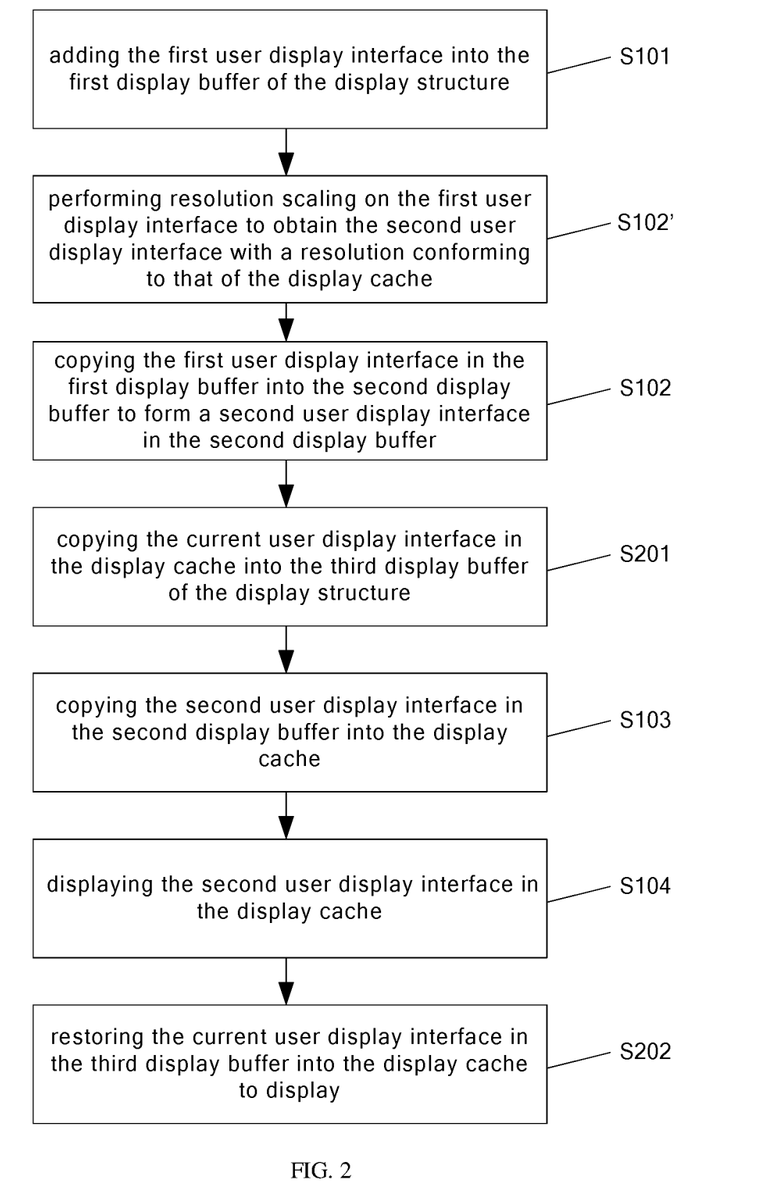
FIG. 2 is a flowchart of a display method for displaying by the display structure shown in FIG. 1 in an embodiment of the present disclosure.

Based on the physical architecture of the display structure in above embodiment, an embodiment of the present disclosure provides a display method employing the display structure in the above embodiment. As shown in FIG. 2, the display method includes following steps.

Step S101: adding the first user display interface into the first display buffer of the display structure.

Step S102: copying the first user display interface in the first display buffer into the second display buffer to form a second user display interface in the second display buffer.

In this step, the first user display interface is copied into the second display buffer in the form of frame data.

In this embodiment, if the resolution of the first user display interface is different from the resolution of the second display buffer, the display method further includes Step S102': before Step S102, performing resolution scaling on the first user display interface to obtain the second user display interface with a resolution conforming to that of the display cache, so that it can be ensured that the first user display interface copied into the second display buffer is not distorted.

The step S102' specifically includes: when the resolution of the first display buffer is less than the resolution of the second display buffer, scaling up the first user display interface to obtain the second user display interface; when the resolution of the first display buffer is greater than the resolution of the second display buffer, the first user display interface is scaled down to obtain the second user display interface.

Step S103: copying the second user display interface in the second display buffer into the display cache.

In this step, the second user display interface is copied into the display cache in the form of frame data.

Step S104: displaying the second user display interface in the display cache.

It should be noted that, in the display method of this embodiment, before performing the step S101, it is required to first allocate the first display buffer and the second display buffer in the memory, and open the currently used display cache (the display cache is also allocated from the memory, and the display cache is already allocated by the operating system), so that the display method can be executed smoothly. If the allocated sizes of the first display buffer and the second display buffer are not enough, or the display cache is occupied and cannot be opened, the display method of this embodiment cannot be performed.

Compared with the standard UI display mechanism (i.e., the standard user interface display method) of the existing Android system, the display method for displaying by using the display structure in this embodiment can greatly reduce the number of processes during each display operation, reduce the time for each drawing and thus reduce the display time overhead, and then requirements of some display situations having high real time requirements that cannot be met by the standard UI display framework can be satisfied and the display efficiency of the user interface is increased.

In this embodiment, the display method for displaying by using the above display structure further includes: Step S201, copying the current user display interface in the display cache into the third display buffer of the display structure. In addition, the display method further includes: Step S202, restoring the current user display interface in the third display buffer into the display cache to display.

The setting of the step S201 and the step S202 can back up the current user display interface previously stored in the display cache into the third display buffer to prevent the current user display interface previously stored in the display cache 3 from cannot being restored due to being overwritten by storing the display content of the display structure into the display cache 3, thus it is ensured that the current user display interface previously stored in the display cache 3 can be restored and displayed when the display cache 3 does not store the display content of the display structure any longer, for example, in the Android system, when the above display method of the embodiment is not executed, the display cache 3 does not store the display content of the display structure any longer, the display content of the standard UI display framework previously stored in the display cache 3 can be restored from the third display buffer 4 to the display cache 3 and then the Android system can execute display according to the original standard UI display mechanism.

It should be noted that the step S201 may be performed before the step S101, or may be performed before the step S103, as long as the current user display interface in the display cache is backed up to the third display buffer before the second user display interface is copied into the display cache. In addition, the step S202 is performed after the above display method of this embodiment is completed, that is, the step S202 is performed after the step S104 is completed, so as to ensure that the operating system can restore its original mechanism after execution of the above display method in this embodiment is completed.

Figure 3:
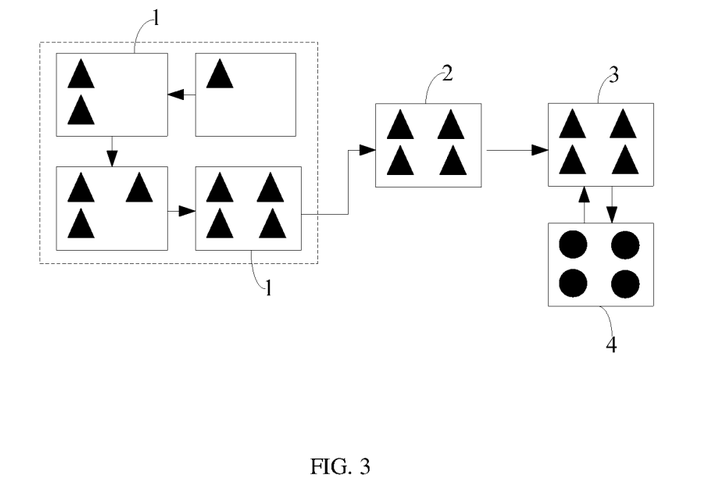
FIG. 3 is a schematic diagram of a display procedure of a display method for displaying by using the display structure shown in FIG. 1 in an embodiment of the present disclosure.

For example, a specific display mechanism for displaying by using the display structure in the above embodiment (that is, the specific processes of the above step S101 to step S202) is as shown in FIG. 3. First, the first user display interface, such as user interface elements to be displayed, is added to the first display buffer 1 after it is drawn, wherein, the user interface elements to be displayed may be drawn one by one, and then added to the first display buffer 1 one by one, alternatively, the user interface elements to be displayed may also be added to the first display buffer 1 together. Alternatively, the first user display interface, for example, the user interface to be displayed, is added to the first display buffer 1 after being drawn. Then, the first user display interface in the first display buffer 1 is copied into the second display buffer 2, wherein, the copying process is performed in the form of a frame image. At the same time, it requires to determine whether the resolution of the copied frame image conforms to the resolution of the display cache 3, if not, during the process of copying, the resolution of the frame image needs to be scaled so that it conforms to the resolution of the display cache 3. Then, the current user display interface (for example, the standard UI display framework of the Android system) in the display cache 3 is copied into the third display buffer 4 to free up the storage space of the display cache 3 while preventing the current user display interface previously stored in the display cache 3 from cannot being restored due to being overwritten. Next, the second user display interface in the second display buffer 2 is copied into the display cache 3, and the copying is also performed in the form of frame image. Then, the second user display interface in the display cache 3 is displayed, that is, the second user display interface in the display cache 3 is displayed through the display screen, thereby implementing the display mechanism using the display structure. Finally, after displaying of the display content of the display structure is completed, if it is necessary to restore the original display mechanism of the operating system, the current user display interface in the third display buffer 4 is restored to the display cache 3 and displayed. Certainly, if it is not necessary to restore the original display mechanism of the operating system, step S202 needs not to be performed.

Figure 4:
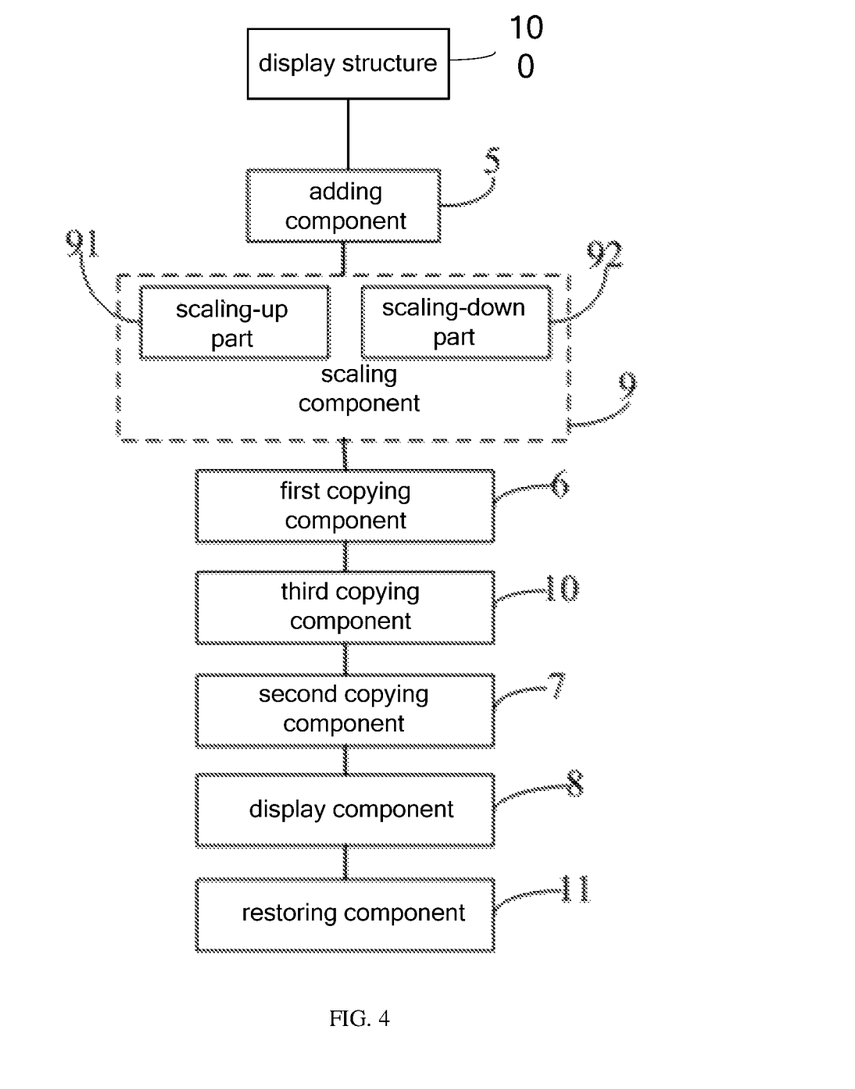
FIG. 4 is a principle block diagram of a display device for displaying by using the display structure shown in FIG. 1 in an embodiment of the present disclosure.

Correspondingly, an embodiment of the present disclosure also provides a display device including the display structure 100 in the above embodiment. As shown in FIG. 4, the display device further includes: an adding component 5 configured to add the first user display interface to the first display buffer of the display structure; a first copy component 6 configured to copy the first user display interface in the first display buffer into the second display buffer to form the second user display interface in the second display buffer; a second copy component 7 configured to copy the second user display interface in the second display buffer into the display cache; and a display component 8 configured to display the second user display interface in the display cache.

In this embodiment, the display device further includes a scaling component 9 configured to perform resolution scaling on the first user display interface to obtain a second user display interface with a resolution that conforms to the resolution of the display cache. The setting of the scaling component 9 ensures that the first user display interface copied into the second display buffer is not distorted. The scaling component 9 includes: an scaling-up part 91 configured to scale up the first user display interface to obtain the second user display interface when the resolution of the first display buffer is less than the resolution of the second display buffer; a scaling-down part 92 configured to scale down the first user display interface to obtain the second user display interface when the resolution of the first display buffer is greater than the resolution of the second display buffer.

In this embodiment, the display device further includes a third copy component 10 configured to copy the current user display interface in the display cache into the third display buffer of the display structure. In addition, the display device further includes a restoring component 11 configured to restore the current user display interface in the third display buffer to the display cache. The setting of the third copy component 10 and the restoring component 11 can back up the current user display interface previously stored in the display cache to the third display buffer, so as to prevent the current user display interface previously stored in the display cache 3 from cannot being restored due to being overwritten by storing the display content of the display structure into the display cache, thus it is ensured that the current user display interface previously stored in the display cache can be restored and displayed when the display cache does not store the display content of the display structure any longer, for example, in the Android system, when the above display method of the embodiment is not executed, the display cache does not store the display content of the display structure any longer, the display content of the standard UI display framework previously stored in the display cache can be restored from the third display buffer to the display cache and then the Android system can execute display according to the original standard UI display mechanism.

Beneficial effects of this embodiment: compared to the standard UI display framework of the existing Android system (i.e., the standard user interface display framework), the display method for displaying by using the display structure can greatly reduce the number of processes during each display operation, reduce the time for each drawing and thus reduce the display time overhead. Requirements of some display situations having high real-time requirements that cannot be met by the standard UI display framework can be satisfied, and the display efficiency of the user interface is increased.

An embodiment of the present disclosure provides an operating system including the display device in the above embodiment.

In some embodiments, the operating system in this embodiment is an Android operating system.

By adopting the display device in the above embodiment, the operating system can meet the requirements for display situations with high real-time requirements, thereby improving the efficiency of the operating system displaying the user interface.

It should be noted that the components, devices, structures, systems and parts herein may be embodied by a hardware, a software or a combination thereof, and the hardware may include a processor, a memory etc.

It should be understood that, the foregoing embodiments are only exemplary embodiments used for explaining the principle of the present disclosure, but the present disclosure is not limited thereto. Various variations and improvements may be made by a person skilled in the art without departing from the spirit and essence of the present disclosure, and these variations and improvements also fall into the protection scope of the present disclosure.

What is claimed is:

1. A display method for displaying by using a display structure, wherein the display structure comprises: a first display buffer configured to store a first user display interface; a second display buffer configured to store a second user display interface; and a display cache, the second user display interface is a user display interface that is obtained by processing the first user display interface and has a resolution conforming to a resolution of the display cache, wherein the display method comprises steps of:
   adding the first user display interface to the first display buffer of the display structure;
   copying the first user display interface in the first display buffer into the second display buffer to form a second user display interface in the second display buffer;
   copying the second user display interface in the second display buffer into the display cache; and
   directly displaying the second user display interface in the display cache.

2. The display method of claim 1, further comprising a step of:
   before the step of copying the first user display interface in the first display buffer into the second display buffer, scaling the resolution of the first user display interface to obtain the second user display interface having a resolution that conforms to the resolution of the display cache.

3. The display method of claim 2, wherein the step of scaling the resolution of the first user display interface to obtain the second user display interface having a resolution that conforms to the resolution of the display cache comprises:
   in a case where the resolution of the first display buffer is less than the resolution of the second display buffer, scaling up the first user display interface to obtain the second user display interface;
   in a case where the resolution of the first display buffer is greater than the resolution of the second display buffer, scaling down the first user display interface to obtain the second user display interface.

4. The display method of claim 3, wherein the display structure further comprises a third display buffer, and the display method further comprises: copying the current user display interface in the display cache into the third display buffer of the display structure.

5. The display method of claim 4, wherein
   the resolution of the first display buffer is equal to the resolution of the first user display interface;
   the resolution of the second display buffer is equal to the resolution of the display cache; and
   the resolution of the third display buffer is equal to the resolution of the display cache.

6. The display method of claim 4, further comprising a step of: restoring the current user display interface in the third display buffer to the display cache to display.

7. The display method of claim 1, wherein the display structure further comprises a third display buffer, and the display method further comprises a step of: copying the current user display interface in the display cache into the third display buffer of the display structure.

8. The display method of claim 7, further comprising a step of: restoring the current user display interface in the third display buffer to the display cache to display.

9. The display method of claim 1, wherein the first user display interface is copied into the second display buffer in the form of frame data; and
   the second user display interface is copied into the display cache in the form of frame data.

10. A display device comprising:
   a display structure; and
   a processor,
   wherein the display structure comprises: a first display buffer configured to store a first user display interface; a second display buffer configured to store a second user display interface; and a display cache, the second user display interface is a user display interface that is obtained by processing the first user display interface and has a resolution conforming to a resolution of the display cache, and
   wherein the processor performs program instructions to function as:
   an adding component configured to add the first user display interface to the first display buffer of the display structure;
   a first copy component configured to copy the first user display interface in the first display buffer into a second display buffer to form the second user display interface in the second display buffer;
   a second copy component configured to copy the second user display interface in the second display buffer to a display cache; and
   a display component configured to directly display the second user display interface in the display cache.

11. The display device of claim 10, wherein the processor further performs program instructions to function as:
   a third copy component configured to copy a current user display interface in the display cache into a third display buffer of the display structure.

12. The display device of claim 11, wherein the processor further performs program instructions to function as:
   a scaling component configured to scale the resolution of the first user display interface to obtain the second user display interface having a resolution that conforms to the resolution of the display cache.

13. The display device of claim 12, wherein the processor further performs program instructions to function as:
   an scaling-up part configured to scale up the first user display interface to obtain the second user display interface in a case where the resolution of the first display buffer is less than the resolution of the second display buffer;

a scaling-down part configured to scale down the first user display interface to obtain the second user display interface in a case where the resolution of the first display buffer is greater than the resolution of the second display buffer.

14. The display device of claim 13, wherein
the resolution of the first display buffer is equal to the resolution of the first user display interface;
the resolution of the second display buffer is equal to the resolution of the display cache; and
the resolution of the third display buffer is equal to the resolution of the display cache.

15. The display device of claim 11, wherein the processor further performs program instructions to function as:
a restoring component configured to restore the current user display interface in the third display buffer into the display cache.

16. An operating system, which comprises the display device of claim 11.

17. An operating system, which comprises the display device of claim 10.

\* \* \* \* \*